(12) United States Patent
Ko

(10) Patent No.: US 11,087,714 B2
(45) Date of Patent: Aug. 10, 2021

(54) DISPLAY DEVICE AND OPERATION METHOD THEREOF

(71) Applicant: Acer Incorporated, New Taipei (TW)

(72) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/701,111

(22) Filed: Dec. 2, 2019

(65) Prior Publication Data

US 2021/0110788 A1 Apr. 15, 2021

(30) Foreign Application Priority Data

Oct. 15, 2019 (TW) ................................. 108137085

(51) Int. Cl.
*G09G 5/10* (2006.01)
*G06T 11/60* (2006.01)
*G02F 1/13357* (2006.01)

(52) U.S. Cl.
CPC .............. *G09G 5/10* (2013.01); *G06T 11/60* (2013.01); *G02F 1/133603* (2013.01); *G09G 2320/0686* (2013.01)

(58) Field of Classification Search
CPC .............. G09G 5/10; G09G 2320/0686; G02F 1/133603; G06T 11/60
See application file for complete search history.

(56) References Cited

U.S. PATENT DOCUMENTS

| 2014/0198137 A1* | 7/2014 | Feng | G09G 3/3406 345/690 |
| 2014/0315618 A1* | 10/2014 | Fujisawa | G07F 17/34 463/20 |
| 2019/0384112 A1* | 12/2019 | Yang | G09G 3/3611 |
| 2020/0249507 A1* | 8/2020 | Chen | G02B 6/005 |

FOREIGN PATENT DOCUMENTS

| CN | 103035209 | 4/2013 |
| CN | 105096845 | 11/2015 |
| CN | 106912090 | 6/2017 |
| CN | 109859718 | 6/2019 |
| TW | 200925980 | 6/2009 |
| TW | M574760 | 2/2019 |

* cited by examiner

*Primary Examiner* — Muhammad N Edun
(74) *Attorney, Agent, or Firm* — JCIPRNET

(57) ABSTRACT

A display device and an operation method thereof are provided. The display device includes a backlight panel and a backlight control circuit. The backlight panel provides backlight to a display panel. The backlight control circuit is coupled to the backlight panel. The backlight control circuit receives prompt area information. The prompt area information is configured to indicate a prompt area in a display area of the display panel. The backlight control circuit controls the backlight panel according to the prompt area information to adjust the backlight corresponding to the prompt area. In this way, a backlight effect of the prompt area is different from a backlight effect of one of other areas in the display area.

15 Claims, 3 Drawing Sheets

DISPLAY DEVICE AND OPERATION METHOD THEREOF

CROSS-REFERENCE TO RELATED APPLICATION

This application claims the priority benefit of Taiwan application serial no. 108137085, filed on Oct. 15, 2019. The entirety of the above-mentioned patent application is hereby incorporated by reference herein and made a part of this specification.

BACKGROUND

Technical Field

The disclosure relates to an electronic device. More particularly, the disclosure relates to a display device and an operation method thereof.

Description of Related Art

A backlight panel may provide backlight to a display panel. Generally, backlight of the display panel is stable and uniform. That is, the backlight effect of any area in the display area of the display panel is static and consistent.

SUMMARY

The disclosure provides a display device and an operation method thereof capable of providing different backlight effects to different areas in a display area of a display panel.

In an embodiment of the disclosure, a display device includes a backlight panel and a backlight control circuit. The backlight panel is configured to provide backlight to a display panel. The backlight control circuit is coupled to the backlight panel. The backlight control circuit is configured to receive prompt area information. The prompt area information is configured to indicate a prompt area in a display area of the display panel. The backlight control circuit controls the backlight panel according to the prompt area information to adjust the backlight corresponding to the prompt area. In this way, a backlight effect of the prompt area is different from backlight effects of other areas in the display area.

In an embodiment of the disclosure, an operation method includes the following steps. Backlight is provided to a display panel by a backlight panel. Prompt area information is received by a backlight control circuit. The prompt area information is configured to indicate a prompt area in a display area of the display panel. Further, the backlight panel is controlled by the backlight control circuit according to the prompt area information to adjust the backlight corresponding to the prompt area. In this way, a backlight effect of the prompt area is different from backlight effects of other areas in the display area.

Based on the above, the display device provided by the embodiments of the disclosure may receive the prompt area information. That is, the display area of the display panel may be divided into the prompt area and other areas. According to the prompt area information, the backlight control circuit may control the backlight panel to adjust backlight of the prompt area. In this way, the backlight effect of the prompt area is different from the backlight effects of other areas. Since different backlight effects are provided to different areas of the display panel, the display device may exhibit an increasing number of visual effects.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
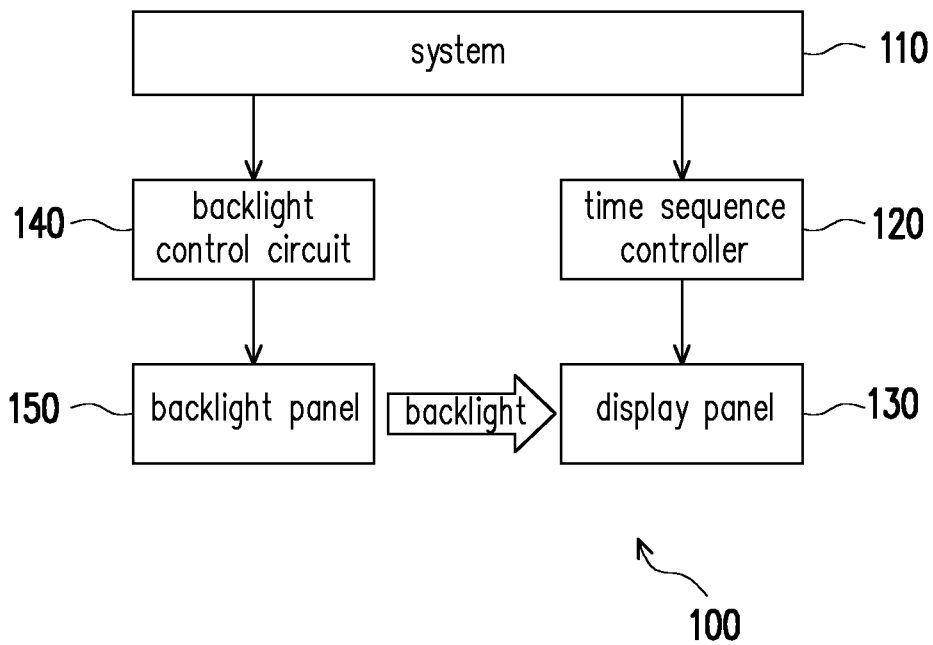
FIG. 1 is a schematic view of circuit blocks of a display device according to an embodiment of the disclosure.

The term "coupled to (or connected to)" used in the entire disclosure (including claims) refers to any direct or indirect connecting means. For example, if the disclosure describes a first apparatus is coupled to (or connected to) a second apparatus, the description should be explained as the first apparatus that is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements. Moreover, elements/components/steps with the same reference numerals represent the same or similar parts in the figures and embodiments where appropriate. Descriptions of the elements/components/steps with the same reference numerals or terms in different embodiments may be references for one another.

FIG. 1 is a schematic view of circuit blocks of a display device 100 according to an embodiment of the disclosure. The display device 100 shown in FIG. 1 includes a system 110, a time sequence controller 120, a display panel 130, a backlight control circuit 140, and a backlight panel 150. The system 110 may provide display content to the time sequence controller 120. The time sequence controller 120 may drive (control) the display panel 130 to display an image according to the provided display content. According to design needs, the display panel 130 may be a display panel of any type. For instance, the display panel 130 may be a liquid crystal display (LCD) panel, an electronic paper (E-paper) panel, or a non-self illuminating display panel of other types.

Figure 2:
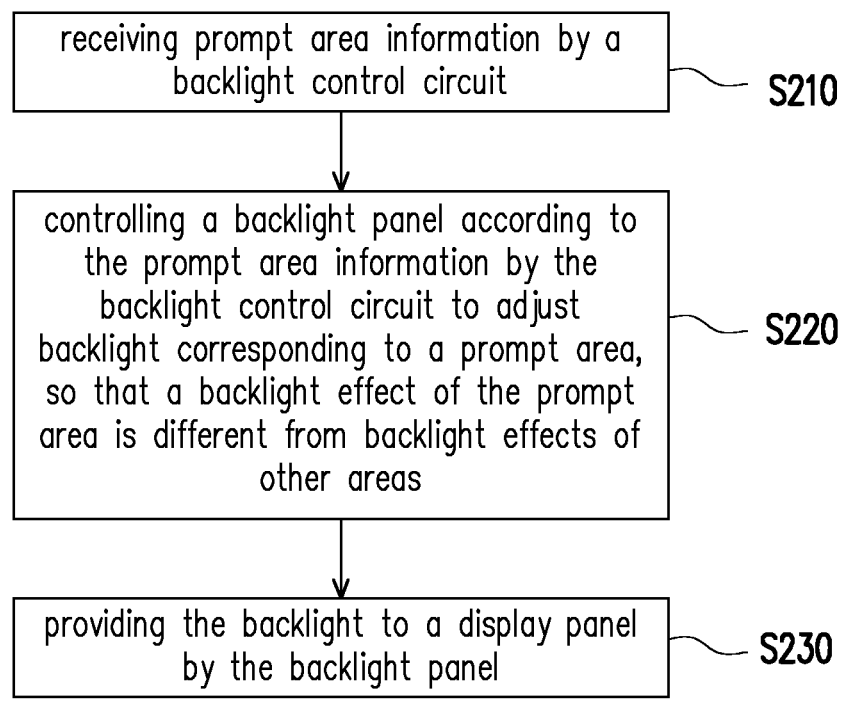
FIG. 2 is a schematic flow chart of an operation method of a display device according to an embodiment of the disclosure.

FIG. 2 is a schematic flow chart of an operation method of a display device according to an embodiment of the disclosure. With reference to FIG. 1 and FIG. 2, in step S210, the backlight control circuit 140 may receive prompt area information from the system 110. The prompt area information may indicate one (or a plurality of) prompt area in a display area of the display panel 130. For instance, it is assumed that a warning text is present in the display content of the display panel 130. According to design needs, the system 110 may define an area where the warning text is located as one prompt area and then transmits prompt area information of this prompt area to the backlight control circuit 140. Alternatively, it is assumed that an advertised item is provided in the display content of the display panel 130. According to design needs, the system 110 may define an area where the advertised item is located as one prompt area and then transmits prompt area information of this prompt area to the backlight control circuit 140.

The backlight control circuit 140 is coupled to the backlight panel 150. In step S220, the backlight control circuit 140 controls the backlight panel 150 according to the prompt area information to adjust backlight corresponding to the prompt area. In this way, a backlight effect of the prompt area is different from backlight effects of other areas in the display area. Since the backlight panel 150 is controlled by the backlight control circuit 140, the backlight panel 150 may provide the backlight to the display panel 130 in step S230. According to design needs, the backlight panel 150 may be a backlight panel of any type. For instance, the backlight panel 150 may be a quantum dot light emitting diode (LED) backlight panel, a micro-LED backlight panel, a mini-LED backlight panel, or a backlight panel of other types. A plurality of light emitting diodes are evenly distributed on the backlight panel 150. For instance, because of the control performed by the backlight control circuit 140, the backlight corresponding to the prompt area may be adjusted to have high brightness (compared to other areas) or low brightness (compared to other areas) or may be adjusted to flicker, dynamically change colors, or exhibit other backlight effects.

Based on the display content of the display panel 130, backlight effects of some areas of the backlight panel 150 may be adaptively changed, so that an increasing number of visual effects are presented, and different user experiences are thus provided. Therefore, the display device 100 may provide backlight effects of new types, and in this way, vivid area images are provided, and visibility of image content is improved. Even if the display content of the display panel 130 is a static image, the backlight control circuit 140 may still be able to control the backlight panel 150 to provide a prompt effect, an emphasizing effect, or other visual effects to a local area (the prompt area). The prompt area may not be limited by a brightness distribution (or a histogram).

Figure 3:
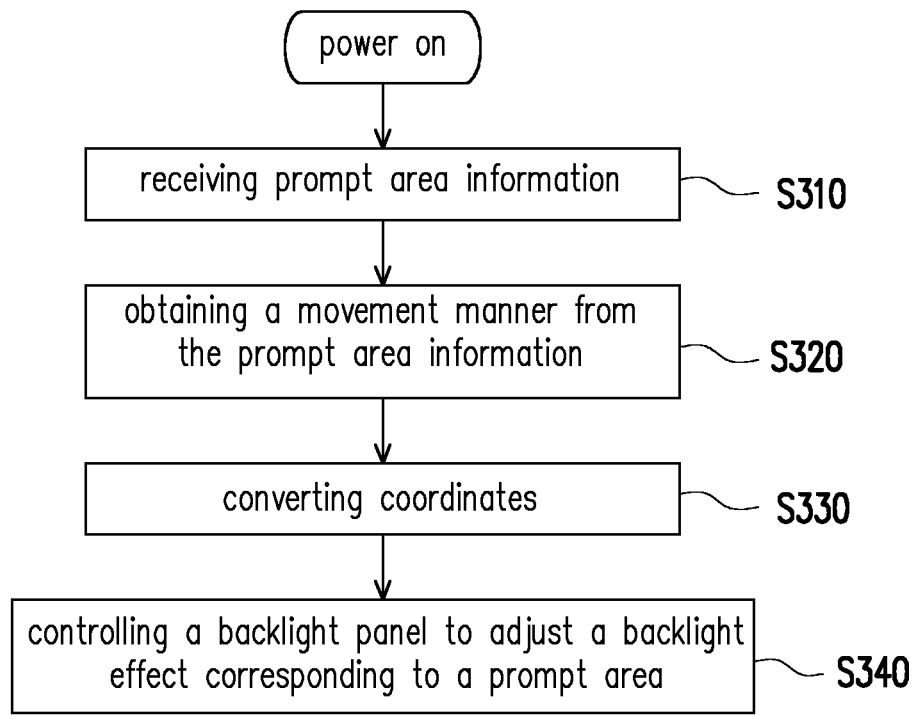
FIG. 3 is a schematic flow chart of an operation method of a display device according to another embodiment of the disclosure.

FIG. 3 is a schematic flow chart of an operation method of a display device according to another embodiment of the disclosure. With reference to FIG. 1 and FIG. 3, after power is on, the backlight control circuit 140 may confirm that whether a "backlight prompt area" function is supported by the display content with the system 110. For instance, the backlight control circuit 140 checks that whether the system 110 provides the prompt area information. When the "backlight prompt area" function is supported by the system 110, the backlight control circuit 140 receives the prompt area information from the system 110 (step S310). According to design needs, the prompt area information may indicate at least one of a position, a size, and a shape of the prompt area in the display area of the display panel 130. For instance, the prompt area information may include coordinates of an object of interest in the display content of the display panel 130. According to application needs, the object of interest may include an icon, an advertised item, a text string, a warning text, or other objects.

According to design needs, the prompt area information may also indicate the backlight effect of the prompt area. For instance, the backlight effect of the prompt area includes at least one of a color changing effect, a highlighting effect, and a dynamic changing effect. According to application needs, the color changing effect may be setting a color of the backlight corresponding to the prompt area to a color different from colors of backlight of other areas. According to application needs, the dynamic changing effect includes at least one of flickering, dynamic size changing, and dynamic drifting. In step S320, the backlight control circuit 140 may obtain a movement manner (the backlight effect) from the prompt area information.

In step S330, the backlight control circuit 140 may perform coordinate conversion. The prompt area information may provide coordinates of the prompt area in the display panel 130 to the backlight control circuit 140. Next, the backlight control circuit 140 converts the coordinates of the prompt area into coordinates in the backlight panel 150. Based on the movement manner (the backlight effect) of step S320 and the coordinates of step S330, the backlight control circuit 140 may control the backlight panel 150 in step S340 to adjust the backlight corresponding to the prompt area. In this way, the backlight effect of the prompt area is different from the backlight effects of other areas of the backlight panel 150.

The backlight control circuit 140 may assist an operating system in providing a message reminder. For instance, when Wi-Fi connection is not available, the backlight control circuit 140 may adjust backlight of a "Wi-Fi icon". For instance, local backlight (the prompt area) corresponding to the "Wi-Fi icon" may be changed to exhibit high brightness (or a backlight color may be changed). When battery power is excessively low, the backlight control circuit 140 may adjust backlight of a "battery power icon". For instance, local backlight (the prompt area) corresponding to the "battery power icon" may be adjusted to flicker, or a color of the local backlight corresponding to the "batter power icon" may be dynamically changed continuously. When an e-mail is received, the backlight control circuit 140 may adjust backlight of an "e-mail icon". For instance, local backlight (the prompt area) corresponding to the "e-mail icon" may be changed to exhibit high brightness and flicker, or a color of the local backlight corresponding to the "e-mail icon" may be dynamically changed continuously. According to design needs, a shape of the prompt area may be an ellipse, a circle, a square, or other geometric shapes. The prompt area information may define the prompt area as being solid, hollow, in-graphic, or out-of-graphic.

Figure 4:
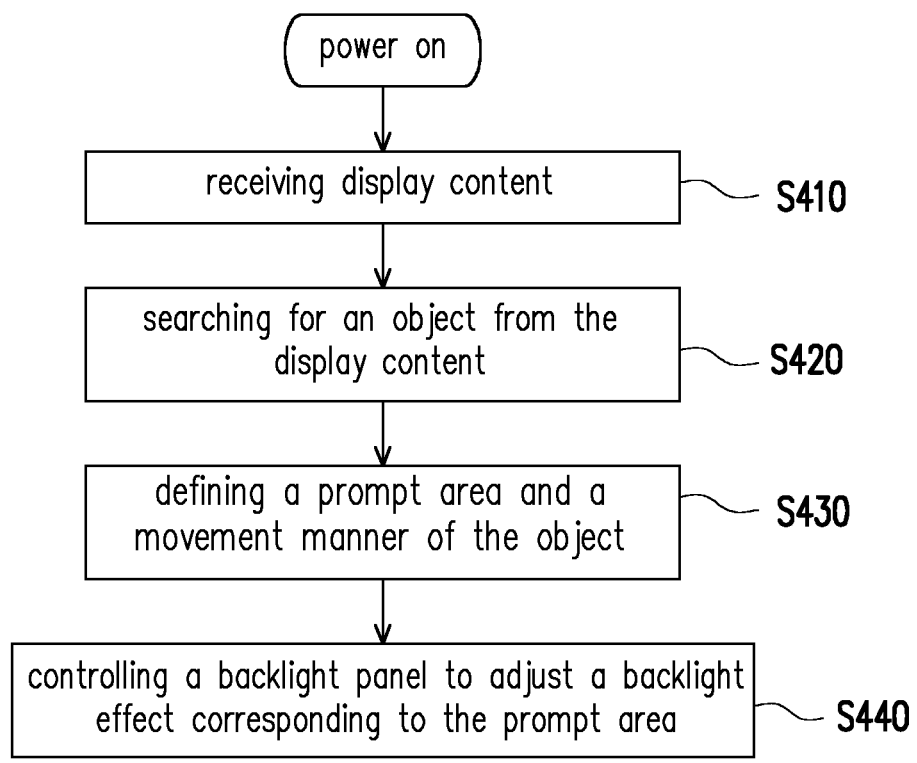
FIG. 4 is a schematic flow chart of an operation method of a display device according to still another embodiment of the disclosure.

When the display content of the system 110 does not support the "backlight prompt area" function, or when the system 110 does not provide the prompt area information, the backlight control circuit 140 may perform the flow as shown in FIG. 4. FIG. 4 is a schematic flow chart of an operation method of a display device according to still another embodiment of the disclosure. With reference to FIG. 1 and FIG. 4, the backlight control circuit 140 receives the display content from the system 110 (step S410). If the display content is a PPT file, a flash file, a psd file, or other files including object layer information, the backlight control circuit 140 may search of an object according to an object outline of the object layer information (step S420). If the display content does not include the object layer information, the backlight control circuit 140 may perform image recognition (or perform other algorithms) to the display content to search for the object (step S420).

In step S430, the backlight control circuit 140 may define a prompt area and a movement manner of the object. For instance, the backlight control circuit 140 may define/adjust a parameter of coordinates, time, luminance, or other backlight effects of local backlight corresponding to the object (the prompt area). Based on the object (prompt area) and the movement manner (backlight effect) in step S430, the backlight control circuit 140 may control the backlight panel 150 in step S440 to adjust backlight corresponding to the prompt area. In this way, the backlight effect of the prompt area is different from the backlight effects of other areas of the backlight panel 150.

Figure 5:
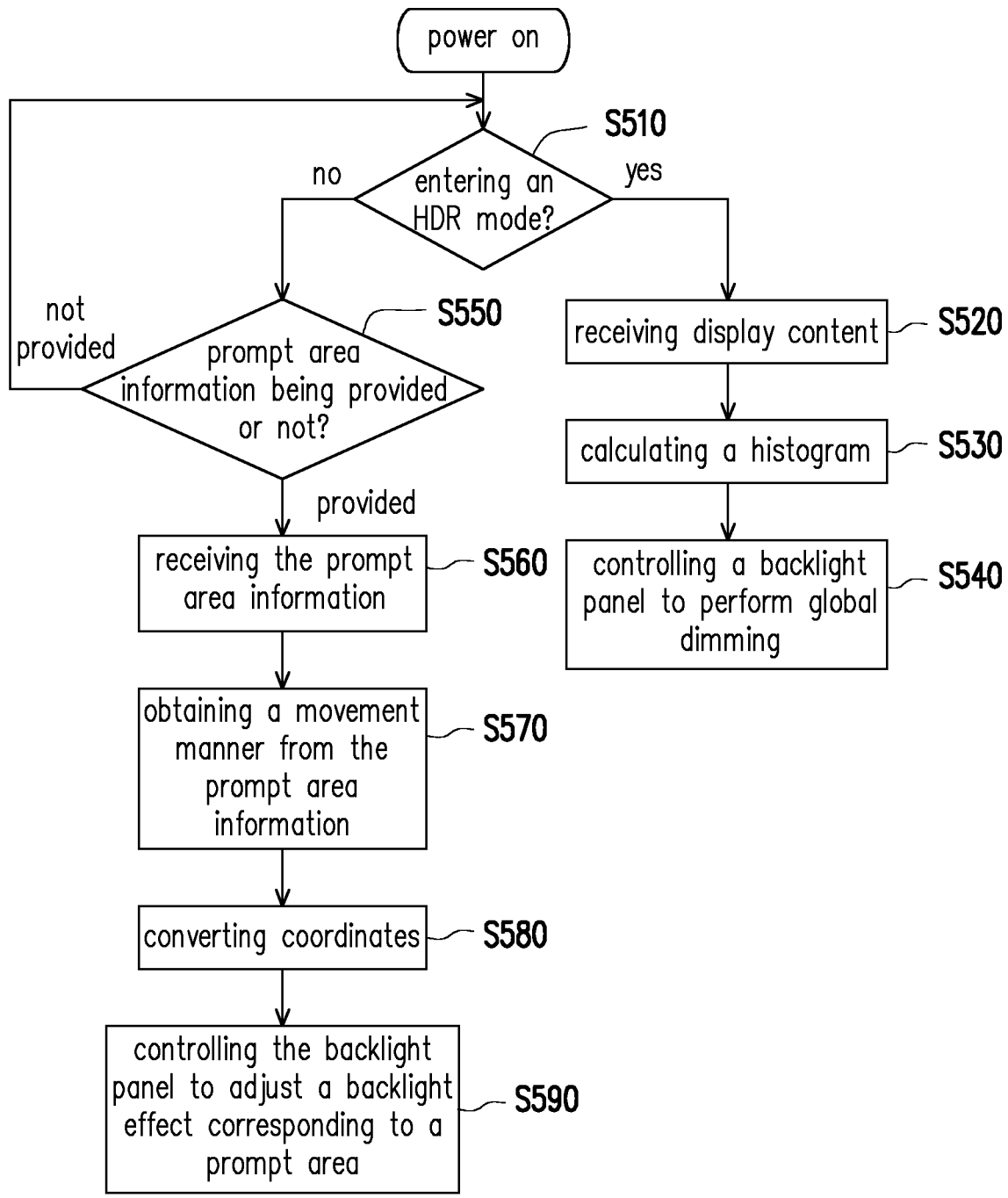
FIG. 5 is a schematic flow chart of an operation method of a display device according to yet another embodiment of the disclosure.

FIG. 5 is a schematic flow chart of an operation method of a display device according to yet another embodiment of the disclosure. With reference to FIG. 1 and FIG. 5, in step S510, the backlight control circuit 140 may determine whether the backlight control circuit 140 enters a high dynamic range (HDR) mode. For instance, in some embodiments, the backlight control circuit 140 may determine whether the backlight control circuit 140 enters the HDR mode based on control performed by the system 110. When the backlight control circuit 140 enters the HDR mode (a determination result of step S510 is "yes"), the backlight control circuit 140 performs step S520. The backlight control circuit 140 receives display content from the system 110 (step S520) and calculates a histogram of the display content (step S530). In step S540, the backlight control circuit 140 may control the backlight panel 150 to perform global dimming, so that a frame of the display panel 130 may present an HDR effect.

When the backlight control circuit 140 does not enter the HDR mode (the determination result of step S510 is "no"), the backlight control circuit 140 performs step S550. In step S550, the backlight control circuit 140 may confirm that whether the "backlight prompt area" function is supported by the display content with the system 110. For instance, the backlight control circuit 140 checks that whether the system 110 provides the prompt area information. When the "backlight prompt area" function may be supported by the system 110 (the determination result of step S550 is "yes"), the backlight control circuit 140 receives the prompt area information from the system 110 (step S560). Step 560, step S570, step S580, and step S590 shown in FIG. 5 may be deduced by analogy with reference to related description of step S310, step S320, step S330, and step S340 shown in FIG. 3, and repeated content is not provided herein.

According to different design needs, the system 110 and (or) a block of the backlight control circuit 140 may be implemented in the form of hardware, firmware, software (i.e., a program), or a combination of the plurality of the foregoing three.

In the form of hardware, the system 110 and (or) the block of the backlight control circuit 140 may be implemented as a logic circuit on an integrated circuit. A related function of the system 110 and (or) the backlight control circuit 140 may be implemented as hardware by using hardware description languages (e.g., Verilog HDL or VHDL) or other suitable programming languages. For instance, the related function of the system 110 and (or) the backlight control circuit 140 may be implemented in one or a plurality of controllers, a micro controller, a micro processor, an application-specific integrated circuit (ASIC), a digital signal processor (DSP), a field programmable gate array (FPGA), and/or various logic blocks, module, and circuits in other processing units.

In terms of the software form and/or the firmware form, the related function of the system 110 and (or) the backlight control circuit 140 may be implemented as a programming code. For instance, the system 110 and (or) the backlight control circuit 140 may be implemented by using general programming languages (e.g., C, C++, or an assembly language) or other suitable programming languages. The programming code may be recorded/stored in a recording medium, and the recording medium includes, for example, read only memory (ROM), a storage device and/or random access memory (RAM). A computer, a central processing unit (CPU), a controller, a micro controller, or a micro processor may read and execute the programming code from the recording medium to accomplish the related function. In terms of the recording medium, a "non-transitory computer readable medium" may be used. For instance, a tape, a disk, a card, semiconductor memory, a programmable logic circuit, etc. may be used. Further, the program may also be provided to the computer (or CPU) through any transmission medium (a communication network or a broadcast wave, etc.). The communication network includes, for example, Internet, wired communication, wireless communication, or other communication media.

In view of the foregoing, the display device 100 provided by the embodiments of the disclosure may receive the prompt area information. That is, the display area of the display panel 130 may be divided into the prompt area and other areas. According to the prompt area information, the backlight control circuit 140 may control the backlight panel 150 to adjust backlight of the prompt area. In this way, the backlight effect of the prompt area is different from the backlight effects of other areas. Since different backlight effects are provided to different areas of the display panel 130, the display device 100 may exhibit an increasing number of visual effects.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
   a backlight panel, configured to provide backlight to a display panel; and
   a backlight control circuit, coupled to the backlight panel, wherein the backlight control circuit is configured to receive prompt area information, the prompt area information is configured to indicate a prompt area in a display area of the display panel, and the backlight control circuit controls the backlight panel according to the prompt area information to adjust the backlight of a prompt area of the backlight panel corresponding to the prompt area of the display panel, so that a backlight effect of the prompt area of the backlight panel corresponding to the prompt area of the display panel is different from a backlight effect of other area of the backlight panel corresponding to one of other areas in the display area of the display panel, wherein the backlight effect comprises a flicker, a color changing, a highlighting, a low brightness, or a movement manner.

2. The display device as claimed in claim 1, wherein the prompt area information is configured to indicate at least one of a position, a size, and a shape of the prompt area in the display area.

3. The display device as claimed in claim 1, wherein the prompt area information is configured to indicate the backlight effect of the prompt area.

4. The display device as claimed in claim 1, wherein the backlight effect of the prompt area comprises at least one of a color changing effect, a highlighting effect, and a dynamic changing effect.

5. The display device as claimed in claim 4, wherein the dynamic changing effect comprises at least one of flickering, dynamic size changing, and dynamic drifting.

6. The display device as claimed in claim 1, wherein the prompt area in the display area of the display panel includes an object of interest in the display content of the display panel.

7. The display device as claimed in claim 6, wherein the object of interest includes an icon, an advertised item, a text string, or a warning text.

8. The display device as claimed in claim 1, wherein the backlight panel is a quantum dot LED backlight panel, a micro-LED backlight panel, or a mini-LED backlight panel.

9. An operation method of a display device, comprising:
   providing backlight to a display panel by a backlight panel;
   receiving prompt area information by a backlight control circuit; wherein the prompt area information is configured to indicate a prompt area in a display area of the display panel; and
   controlling the backlight panel according to the prompt area information by the backlight control circuit to adjust the backlight of a prompt area of the backlight panel corresponding to the prompt area of the display panel, so that a backlight effect of the prompt area of the backlight panel corresponding to the prompt area of the display panel is different from a backlight effect of other area of the backlight panel corresponding to one of other areas in the display area of the display panel, wherein the backlight effect comprises a flicker, a color changing, a highlighting, a low brightness, or a movement manner.

10. The operation method as claimed in claim 9, wherein the prompt area information is configured to indicate at least one of a position, a size, and a shape of the prompt area in the display area.

11. The operation method as claimed in claim 9, wherein the prompt area information is configured to indicate the backlight effect of the prompt area.

12. The operation method as claimed in claim 9, wherein the backlight effect of the prompt area comprises at least one of a color changing effect, a highlighting effect, and a dynamic changing effect.

13. The operation method as claimed in claim 12, wherein the dynamic changing effect comprises at least one of flickering, dynamic size changing, and dynamic drifting.

14. The operation method as claimed in claim 9, wherein the prompt area in the display area of the display panel includes an object of interest in the display content of the display panel.

15. The operation method as claimed in claim 14, wherein the object of interest includes an icon, an advertised item, a text string, or a warning text.

* * * * *